Oct. 11, 1955     S. S. JACOBS     2,720,352
COMPACTING DEVICE FOR PRESSING PRODUCTS INTO CANS
Filed Aug. 28, 1951
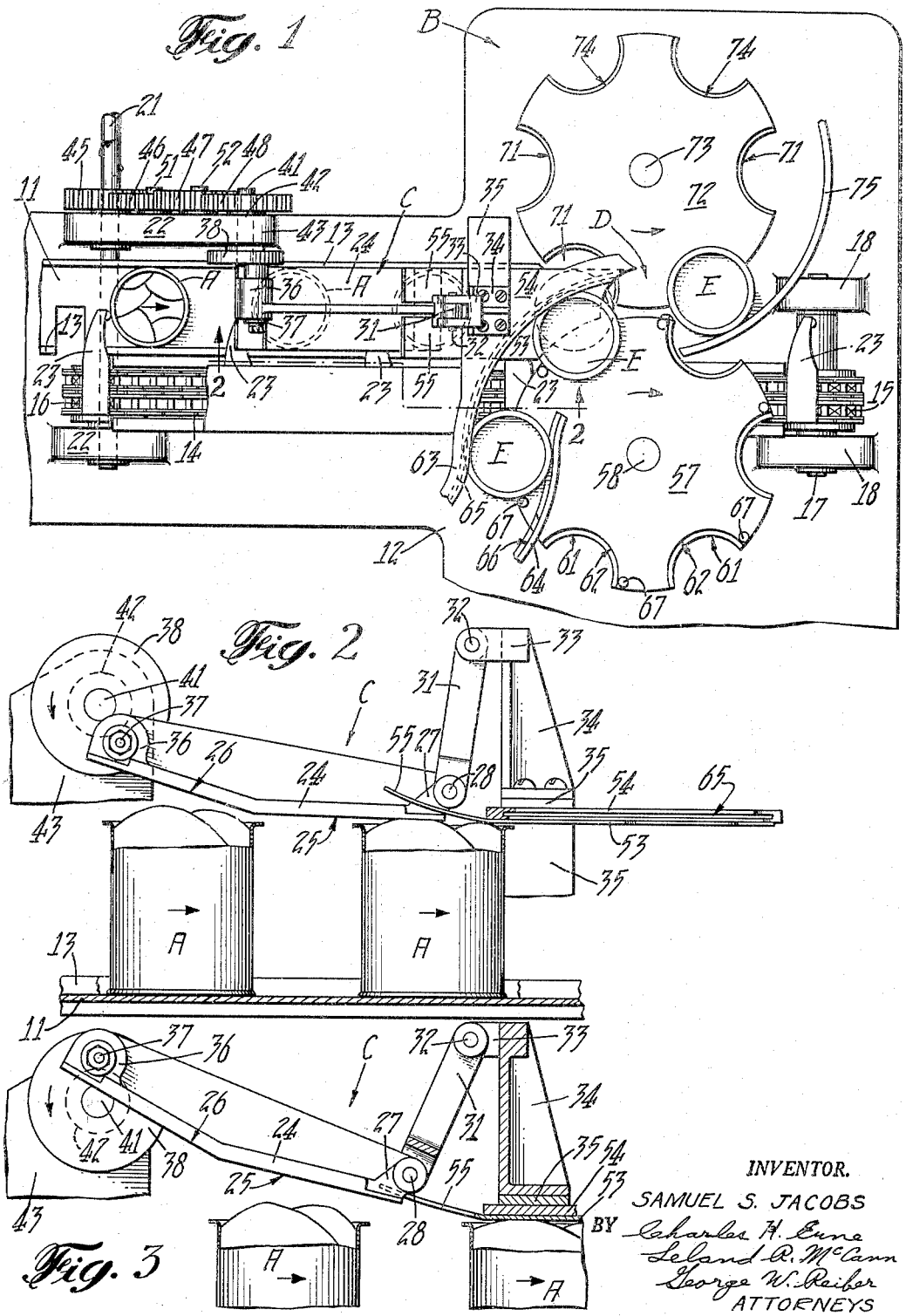
INVENTOR.
SAMUEL S. JACOBS
BY Charles H. Cune
Leland R. McCann
George W. Reiber
ATTORNEYS

United States Patent Office 2,720,352
Patented Oct. 11, 1955

2,720,352
COMPACTING DEVICE FOR PRESSING PRODUCTS INTO CANS

Samuel S. Jacobs, Forest Hills, N. Y., assignor to American Can Company, New York, N. Y., a corporation of New Jersey Application August 28, 1951, Serial No. 243,997

5 Claims. (Cl. 226—71)

This invention relates to can filling and closing machines and has particular reference to a compacting device for gradually pressing and/or returning resilient or floating products into place in filled cans or containers and for holding the products therein prior to closing and sealing the containers.

In the canning of food products, particularly fruits and vegetables, it is the usual practice to fill the cans with a predetermined amount of a product together with a suitable amount of juices, syrups, brines or similar canning liquid. Many food products are resilient or have a tendency to float when combined with their juices or other liquids and thus have a tendency to project above the top edges or mouths of the cans.

Most fruit and vegetable products have a delicate or tender structure which may be bruised or crushed easily if such products are not carefully handled during the operations prior to sealing them. Increased speed in filling, closing and sealing equipment sometimes results in excessive pressure on the product before displaced or projecting portions can freely move back into position within the can. In some instances portions of the product are wiped or pushed over the top edge of the can which results in messy fill or under weight of the product within the can.

The present invention contemplates overcoming these difficulties by the provision of a novel compacting device which is simple in construction and which may be installed in the canning line between a can filling machine and a can closing machine or in combination with a can topping device if one is used, for gradually and gently pressing the product extending above the proper level of a filled can back into proper place within the can preparatory to applying and sealing a cover to the can.

An object of the invention is the provision of a compacting device which is operated in time with the advancement of and travels with filled cans moving toward a closing machine for gradually and gently urging or pushing resilient or floating products projecting above the top edge of filled cans back into the can preparatory to closing and sealing the can.

Another object is the provision of a compacting device for cans filled with food products such as fruits, vegetables and the like wherein portions of the product extending above the top of the can are gradually and gently pushed or pressed back into the can to assure a predetermined normal weight or volume of product within each can.

A further object is the provision of a device of the character described wherein tender food products such as fruits, vegetables and the like projecting above the top edge of filled cans are gradually and gently pushed or pressed back to a proper level in the cans without bruising or crushing the product.

Numerous other objects and advantages of the invention will be apparent as it is better understood from the following description, which, taken in connection with the accompanying drawings, discloses a preferred embodiment thereof.

Referring to the drawings:

Figure 1 is a top plan view of a can closing machine including the novel compacting device embodying the instant invention, parts being broken away;

Fig. 2 is an enlarged fragmentary front elevation of the device shown in Fig. 1, the view being taken along a vertical plane indicated by the broken line 2—2 in Fig. 1; and Fig. 3 is a view similar to Fig. 2 with the device shown in a different working position.

As a preferred or exemplary embodiment of the present invention, the drawings disclose the essential parts of a compacting device associated with a high speed can closing and sealing machine, wherein filled cans are advanced in timed order so that resilient, floating or projecting products extending above the top edges of the cans are gradually and gently urged back to a proper level within the cans prior to applying covers thereto, after which, each can and cover is advanced together as a unit for introduction into a pocket of a rotatable turret which forms part of a more elaborate can sealing machine.

Cans A (Figs. 1 and 2) filled with a predetermined weight or volume of a product together with their juices, a syrup, brine or other preserving liquid are advanced along a conveyor table 11 leading to a can closing machine B. At the entrance to this machine, the filled cans A pass beneath the can compacting device C of the present invention which is located above the conveyor table and which is operated in time with the can advancement and with the closing machine. The conveyor table 11 may be secured in any suitable manner to a main frame 12 of the closing machine.

The cans A move between guide rails 13 as they are fed along the conveyor table 11 by a chain conveyor 14 (preferably of double width) which is located adjacent the table and which operates over spaced chain sprockets 15, 16 (Fig. 1). The chain sprocket 15 is mounted on a shaft 17, journaled in bearings 18, formed in the main frame of the machine. Sprocket 16 is mounted on a drive shaft 21, journaled in bearings 22 in the machine main frame. The drive shaft 21 may be operated in any suitable manner in time with the operation of the closing machine.

The conveyor 14 carries a plurality of spaced and laterally extending feed arms 23 (Fig. 1) which engage behind the filled cans and advance them along the conveyor table 11 in proper sequence with the operation of the compacting device C.

As an advancing can A on the conveyor table 11 moves beneath the compacting device C, a compacting plate 24 of angular construction located above the path of travel of the filled cans, swings, oscillates or pivots downwardly towards the top of a passing can to gradually urge or gently push into the can any of the product which has a tendency to spring upward or float above or hang over the top of the can. In order to prevent bruising or crushing of the product, the compacting plate preferably is oscillated in a manner to move toward and travel with the advancing can in a substantially horizontal or longitudinal direction so that downward and transverse pressure against the product is applied gradually and gently giving projecting portions of the tender product sufficient time to move freely without undue crowding and thus assume a properly levelled position within the can.

The compacting plate 24 preferably is formed with a flat horizontal compacting face 25 (Fig. 2) which is engageable with the product extending above the top edge of the can and for this purpose the face 25 is movable downwardly and longitudinally into a substantially horizontal plane close to and parallel with the top edge of the travelling cans during a compacting operation. A rearward continuation of the compacting face 25 extends obliquely upwardly and outwardly at 26 (as viewed at the left in Figs. 2 and 3) to clear an oncoming can in its initial movement.

The compacting plate 24 is formed with a lug 27 on its inner or forward end which is pivotably connected to a rocker pin 28 carried in the lower end of a drag or rocker link 31. This rocker link is pivotally supported at its upper end on a pin 32 carried in a lug 33 of a bracket 34 secured to an intermediate frame 35 mounted on the machine frame to give the compacting plate an oscillating motion. The opposite oblique or outer or rear end of the compacting plate 24 is formed with a lug 36 which is pivotally connected by a crank pin 37 secured in a crank disc 38 which is mounted on a crank shaft 41 journaled in a bearing 42 of a bracket 43 formed integral with one of the driving shaft bearings 22.

The compacting plate 24 executes its downward and horizontal movement by the rotation of the crank disc 38 and thus the outer end, through its connection with the crank is rotated in a circular path of travel, while the inner or forward end through its connection with the drag link 31, oscillates or swings in a substantially horizontal path toward and away from the entrance of the closing machine B, which in effect, oscillates the compacting plate, moving it forwardly in time with the advancement of the filled cans A for a compacting operation (Figs. 2 and 3). Throughout the return stroke of the compacting plate, the rearward end of the compacting face 25 is raised above the level of the forward end so that the plate is rearwardly inclined (Fig. 3) to clear advancing containers and the product projecting upwardly therefrom.

The crank shaft 41 is rotated from the drive shaft 21 through a gear train (Fig. 1). For this purpose a drive gear 45 mounted on the drive shaft 21 meshes with and drives an intermediate idler gear 46 which also meshes with and drives a second intermediate idler gear 47. The gear 47 meshes with a gear 48 mounted on the crank shaft 41. The intermediate gears 46, 47 are rotatably carried on stub shafts 51, 52 respectively secured in the bearing bracket 43 on the machine main frame 12.

As an advancing can A passes beneath the compacting plate for a compacting operation, the can is moved from a position at the left to one shown on the right as viewed in Fig. 2. During this advancement the horizontal compacting face 25 engages the portions of the product projecting above the top of the can to push them to the proper level beneath the top edge of the can. The can A now is ready to be advanced from beneath the compacting plate for further travel under a stationary hold down plate 53 so that the product is retained within the can A until it receives its cover.

The stationary hold down plate 53 is located beneath a conveyor guide plate 54 and together these plates are secured to the intermediate frame 35. The lower face of this hold down plate is disposed in a plane adjacent the top edge of passing cans (Figs. 2 and 3) and thus retains the product within the cans until the covers are applied. The outer end of the hold down plate preferably is bifurcated and extends outwardly and upwardly in arcuate extensions 55 from its main substantially horizontal portion. These extensions 55 are spaced apart sufficiently to permit the lug 27 at the discharge or inner end of the compacting device C to pass freely therebetween during a working cycle of the compacting device so that the extensions 55 will bridge the gap between the horizontal portion of the hold down plate and the movable inner end of the compacting plate.

The inner ends of the hold down plate 53 and the conveyor guide plate 54 are arcuate in outline as best illustrated in Fig. 1, preferably being concentric with a cover feed turret 57. The innermost end of the hold down plate 53 terminates adjacent a can and cover assembly station D, at which station an individual cover E is applied to the top of a filled can A.

For this purpose covers E are fed individually toward the station D by the cover feed turret 57 which receives the covers in the conventional manner from a suitable source of supply. The turret 57 is mounted on the upper end of a vertical shaft 58, journaled in bearings in the main frame. The turret shaft 58 is driven in any suitable manner in time with the conveyor 11.

The cover feed turret 57 has a plurality of spaced semi-circular pockets 61, each pocket being surrounded by a semi-circular ledge 62. Such a ledge is cut back sufficiently for entrance of a cover E deposited therein from cover guide rails 63, 64, each having cover carrying tracks 65, 66 respectively, along which the covers are fed from the supply source.

Feed fingers or studs 67 are secured in the turret, one back of each pocket 61. Each of these fingers extends up to engage and to advance the cover which is directly above a turret pocket until the cover reaches the end of the guide rail 64. At this point the cover drops onto the ledge 62 of the pocket, while part of the cover remains and slides in the cover carrying track 65, which extends into the support plate 54, until it reaches the terminal end of this plate at the assembly station D.

As a filled can A approaches the assembly station D, it is brought into alignment with a cover E moving into this station. Upon reaching the station D, the filled can enters into one of a plurality of moving can receiving pockets 71 of a rotatable turret 72 which represents the turret of a more elaborate can sealing machine (Fig. 1). It is while the assembled cans A and covers E are in these turret pockets that the cans are sealed.

The rotatable turret 72 (Fig. 1) is mounted on the upper end of a vertical shaft 73 which is journaled in bearings in the machine main frame. This turret shaft 73 is rotated in any suitable manner in time with both the turret shaft 58 and the conveyor 11.

Each turret pocket 71 has provision for receiving the cover E and for this reason each pocket 71 is surrounded by a semi-circular ledge 74. As the assembled cans and covers are moved out of the assembly station D, as for example during a sealing operation, they are guided along their path of travel by a guide rail 75 which is concentric with the path of travel of the turret pockets 71, the rail being secured in any suitable manner on the machine main frame.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a compacting device for use in canning, the combination of a support, a conveyor moving adjacent said support for feeding open top containers filled with a product along said support, a compacting plate overlying the path of the open tops of said moving containers and pivotally mounted at its forward end in a substantially horizontally movable mounting, and means for rotating the opposite end of said plate with a combined vertical and horizontal motion relative to said support in time with said conveyor and across the top of a said container for gradually engaging said plate against the product extending above the top of said advancing container and for gently pressing the product to a proper level in said container.

2. In a compacting device for use in canning, the combination of means for supporting and feeding open top containers filled with a product along a path of travel, an elongated compacting plate located above and extending longitudinally of said path of travel and terminating forwardly in a discharge end, means for oscillating said plate from an angular position relative to said path of travel to a position substantially horizontal therewith adjacent the tops of the travelling containers and movable with said containers for gradually engaging against the product projecting above the tops of the containers and for gently pressing the projecting product to a proper level in the containers, hold-down means located above the path of the filled and compacted containers for holding the product compacted in the advancing containers to facilitate application of covers to said containers, said hold-down means having a portion overlying the discharge end of said compacting plate for guiding the compacted product under the hold-down means.

3. In a compacting device for use in canning, the combination of means for supporting and feeding open top containers filled with a product, an elongated compacting plate located above said supporting and feeding means and above the open tops of said containers as they are advanced, the forward end of said compacting plate being pivotally connected to a substantially horizontally movable mounting, and means for moving the rearward end of said plate with a combined vertical and horizontal motion in time with said feeding means to move said plate gradually against the product projecting above the top of each container and thus gently press the projecting product into the container.

4. In a compacting device for can closing machines or the like, the combination of a support, a conveyor operable adjacent said support for feeding open top containers filled with a product therealong, a bracket mounted on said support, a compacting plate located above said conveyor and movable relative thereto and in time with the advancing containers, a drag link pivotally connecting the forward end of said compacting plate to said bracket for confining said forward end of the plate to substantially horizontal movement, and a crank connected to the rearward end of said compacting plate and rotatably operated in time with said conveyor for moving said compacting plate with a combined vertical and horizontal motion relative to the open tops of said containers to thereby gradually engage said plate against the product extending above the tops of successively advanced containers and gently press the product therein as the compacting plate advances with and adjacent a said container.

5. In a compacting device for use in canning, the combination of means for supporting and feeding filled open top containers along a predetermined path of travel, an elongated compacting plate disposed above said containers and extending longitudinally of their path of travel for pressing downwardly the product projecting upwardly from the containers, means for reciprocating said compacting plate and simultaneously raising and lowering the rearward end of said compacting plate, said plate on its forward stroke following the movement of the containers, and means for confining the forward end of said plate to substantially horizontal movement, whereby the rear portion of said plate is raised to incline the plate rearwardly throughout each return stroke and said rear portion of the plate is lowered during each forward stroke of the plate for gradually engaging the plate against the product projecting upwardly from the open end of each container and gently pressing the product downwardly into the container.

References Cited in the file of this patent

UNITED STATES PATENTS

| | | |
|---|---|---|
| 653,063 | Brown | July 3, 1900 |
| 1,341,487 | Warme et al. | May 25, 1920 |
| 2,264,932 | Conway | Dec. 2, 1941 |
| 2,370,292 | Davies | Feb. 27, 1945 |